United States Patent [19]
Mathewson

[11] Patent Number: 5,809,037
[45] Date of Patent: Sep. 15, 1998

[54] INTEGRATED CIRCUIT TESTING

[75] Inventor: Bruce Mathewson, Milton Keynes, United Kingdom

[73] Assignee: ARM Limited, Cambridge, United Kingdom

[21] Appl. No.: 781,051

[22] Filed: Jan. 9, 1997

[30] Foreign Application Priority Data

Apr. 12, 1996 [GB] United Kingdom .................. 9607684

[51] Int. Cl.⁶ ............................ G01R 31/28; G06F 15/00
[52] U.S. Cl. ........................................... 371/22.1; 364/490
[58] Field of Search ................................. 371/22.1, 22.2, 371/22.31, 22.32, 22.5, 22.6, 21.1; 364/550, 221.7, 238, 267.91, 490; 395/183.01, 183.13, 183.18, 183.2, 184.01; 324/73.1

[56] References Cited

U.S. PATENT DOCUMENTS

| | | | |
|---|---|---|---|
| 4,862,072 | 8/1989 | Harris et al. | 324/73 R |
| 5,331,571 | 7/1994 | Aronoff et al. | 364/490 |
| 5,717,695 | 2/1998 | Manela et al. | 371/21.1 |

FOREIGN PATENT DOCUMENTS

| | | |
|---|---|---|
| 0484861 | 5/1992 | European Pat. Off. . |
| 0609047 | 8/1994 | European Pat. Off. . |

*Primary Examiner*—Hoa T. Nguyen
*Attorney, Agent, or Firm*—Nixon & Vanderhye P.C.

[57] ABSTRACT

A system for the debugging of integrated circuit designs containing a plurality of macrocells A, B and C utilises multiplexers 68, 70 and 72 associated with external output connections to select either a normal external output signal or a diagnostic internal signal. In operation, a primary integrated circuit and a tracking integrated circuit are supplied with identical input signals and so adopt identical states. The primary integrated circuit selects the normal external output signals whilst the tracking integrated circuit selects for diagnostic purposes predetermined internal signals. A further tracking integrated circuit 74 may be provided that corresponds to one of the macrocells A within the primary integrated circuit and the tracking integrated circuit to provide further details of the operation of this macrocell.

10 Claims, 9 Drawing Sheets

INTEGRATED CIRCUIT TESTING

BACKGROUND OF THE INVENTION

1. Field of the Invention

This invention relates to the field of integrated circuit testing. More particularly, this invention relates to the testing of integrated circuits containing a plurality of interacting macrocells.

2. Description of the Prior Art

Figure 1:
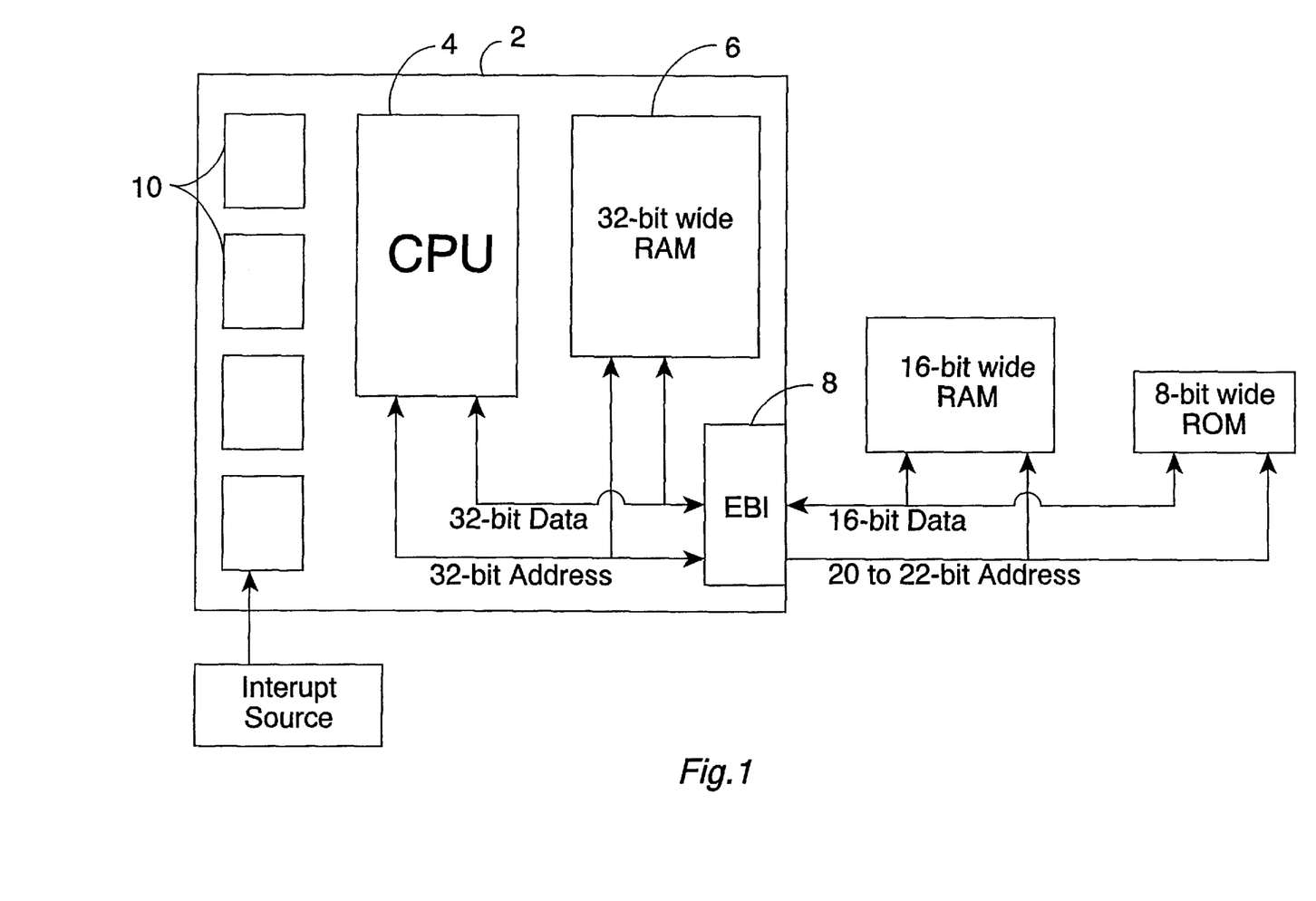
FIG. 1 illustrates an application specific integrated circuit incorporating several macrocells and connected via relatively few output connections to further circuits.

A known trend in integrated circuits has been towards progressively higher levels of integration within a single integrated circuit. Such highly integrated circuits are able to provide complex systems within a single device. An example of such a highly integrated circuit is shown in FIG. 1 of the accompanying drawings. In the example of FIG. 1, an application specific integrated circuit (ASIC) 2 is provided. The ASIC 2 contains a central processing unit core 4, a 32-bit random access memory (RAM) 6, an external bus interface circuit 8 and a plurality of peripheral circuits 10. Each of the components of the ASIC 2 comprises a functional block (macrocell) that may be used within many different ASICs designs. The macrocells within a given ASIC are interconnected within the ASIC and interact to provide the overall function of the ASIC. The potential degree of independence between macrocells on a given ASIC may be such that a single integrated circuit may contain macrocells independently designed by quite separate companies and then placed together by a third company to produce an ASIC providing the particular functionality required by that third company.

As the levels of integration have increased within such circuits, the initial problems with debugging a new design were initially concerned with the physical problem of making connections to such small devices. These problems have continued to increase as the devices have become smaller and have also been made worse by the increasing complexity of the macrocells embedded within such ASICs. For example, a complete central processing unit core may now be embedded within an ASIC together with on-chip RAM and peripherals with only a relatively few functions being required off-chip so reducing the number of external connections needing to be made from the ASIC. Whilst there are considerable cost and packaging advantages in designing an ASIC in this way, the very small number of external connections (pins) around the ASIC compared to the number of signal nodes within the ASIC can make it extremely difficult to determine precisely how the ASIC is behaving and so debug its design.

It is known to provide integrated circuits comprising a plurality of macrocells with the ability to isolate and test individual macrocells within the overall integrated circuit. An example would be an integrated circuit including both a central processing unit core and an on-chip cache memory. When such an integrated circuit has been manufactured, it is possible to isolate the central processing unit core within the integrated circuit and multiplex all of the input signals and output signals of the central processing unit to external pins of the integrated circuit. A sequence of known signals (test vectors) may then be applied to the central processing unit core to check for correct operation. A similar isolation and testing may be separately performed upon the cache memory. Whilst such a technique is useful in checking for manufacturing defects within an integrated circuit, it is of limited use in debugging an integrated circuit design since problems often only occur in the interaction between macrocells and yet this technique requires that each macrocell is examined in isolation.

SUMMARY OF THE INVENTION

Viewed from one aspect the present invention provides apparatus for testing an integrated circuit design, said apparatus comprising:

a primary integrated circuit according to said integrated circuit design, said primary integrated circuit and operable in a normal mode and a diagnostic mode, said primary integrated circuit comprising:

a plurality of macrocells, said plurality of macrocells being interconnected and in operation interacting such that a plurality of signals exchanged between said macrocells are internal signals not available at any external connection to said integrated circuit when operating in said normal mode;

a plurality of multiplexers, each multiplexer serving to select for output from an external output connection of said integrated circuit one of:

in said normal mode of said integrated circuit in which said plurality of macrocells interact, external output signals generated by one of said plurality of macrocells; and in said diagnostic mode of said integrated circuit in which said plurality of macrocells continue to interact as in said normal mode, one of said internal signals;

a tracking integrated circuit having an identical structure to said primary integrated circuit; and a further tracking integrated circuit containing at least one macrocell in common with said primary integrated circuit and said tracking integrated circuit and for which macrocell internal signals output from said tracking integrated circuit may be applied as external input signals to said further tracking integrated circuit to generate external output signals of said macrocell within said further tracking integrated circuit that correspond to internal signals within said tracking integrated circuit; wherein said primary integrated circuit and said tracking integrated circuit are supplied with identical external input signals; and said primary integrated circuit is in said normal mode and said tracking integrated circuit being in said diagnostic mode.

The invention exploits the principle that two integrated circuits of identical design (in practice these may be physically identical devices so avoiding the need to manufacture special purpose integrated circuits just for use in testing) will adopt identical states if stimulated with identical input signals (assuming neither integrated circuit has any manufacturing defect making the circuits different to one another). Given this principle, the primary integrated circuit may be allowed to operate normally with its normal external output signals being directly observable at external output connections and being available for use by other circuits connected to the primary integrated circuit to more closely model its working environment. The tracking integrated circuit can be stimulated with exactly the same input signals as the primary integrated circuit, but in this case multiplexers associated with the external output connections are switched so as to route normally hidden internal signals from within the tracking integrated circuit out to the external output connections where they may be observed. The macrocells within both the primary integrated circuit and the tracking integrated circuit continue to be interconnected, exchange signals and interact in the normal way with the exception that internal signals from the tracking integrated circuit are switched for output from the tracking integrated circuit since the normal and contemporaneous external output signals from the primary integrated circuit can already be captured from the primary integrated circuit. Thus, it is possible to examine internal signals within a production version of the integrated circuit in order to debug the design without having to increase the number of external connections to the integrated circuit.

It will be appreciated that the standard approach of increasing the number of external connections to an integrated circuit merely for debugging purposes is highly disadvantageous. More particularly, in many modern integrated circuit designs, the area of the integrated circuit is constrained to a minimum size by the number of external connection pads that must be provided around the periphery of the integrated circuit. If fewer external connection pads could be provided, then the area of the integrated circuit could be reduced so making the production yields of the integrated circuit rise and the cost of the integrated circuit fall.

Furthermore, the feature of the further tracking integrated circuit effectively allows the principle of tracking to be applied twice in that if all of the input signals to a macrocell within the primary or tracking integrated circuit can be obtained, then these may be applied to a stand-alone version of that macrocell (which is often readily available) in the further tracking integrated circuit that will yield at its external output connection signals that correspond to further internal signals within the primary integrated circuit and the tracking integrated circuit. Thus, additional internal signals within the primary integrated circuit and tracking integrated circuit may be recreated by the further tracking integrated circuit without having to use external connections of the primary integrated circuit and the tracking integrated circuit, which are limited in number. The further tracking integrated circuit may comprise an integrated circuit containing the macrocell under investigation with switched multiplexers being used to feed otherwise only internal input/output signals of that macrocell to external pins.

Preferred embodiments of the invention incorporate a monitoring circuit responsive to external signals to and form said further tracking integrated circuit to generate control signals for controlling operation of said primary integrated circuit and said tracking integrated circuit.

The recovery of otherwise hidden internal circuits from within the primary integrated circuit and the tracking integrated circuit allows these to be applied to a monitoring circuit that can automatically generate control signals that can be fed back to the primary integrated circuit and the tracking integrated circuit in real time.

Examples of such control signals include interrupt signals and break point signals that can be highly useful in trapping and analysing potentially problem states that can arise within the integrated circuit design.

Whilst the invention may be used to recover internal signals coupled to any macrocell within the primary integrated circuit and the tracking integrated circuit, the invention is particularly useful in embodiments in which said plurality of macrocells include a central processing unit core and all internal signals input to said central processing unit core within said primary integrated circuit and said tracking integrated circuit are connected to respective ones of said plurality of multiplexers.

A central processing unit is by its very nature capable of highly complex behaviour as it operates under program instruction control. The considerable flexibility of operation and range of possible behaviour of a central processing unit core can make problems associated with it particularly difficult to debug when it is embedded within a larger integrated circuit design. For this reason, the invention is particularly useful for debugging embedded central processing unit cores.

The application of the invention to central processing unit cores is further enhanced in embodiments in which said further tracking integrated circuit comprises said central processing unit core for which all signals exchanged with other macrocells within said primary integrated circuit and said tracking integrated circuit are coupled to external connections.

Whilst central processing unit cores are often embedded within complex ASICs, it is also common for them to be provided on their own on an individual integrated circuit on which all of their inputs and outputs are externally accessible. The comparative ready availability of stand-alone central processing unit cores allows these to be used as a further tracking integrated circuit and so debug an embedded version of that central processing unit core without having to specially produce a further tracking integrated circuit for that purpose. Furthermore, the same equipment may be used to analyze the central processing unit core irrespective of the ASIC in which it is embedded.

The internal signals that may be routed out of the primary integrated circuit and the tracking integrated circuit via the inultiplexers can be input signals, output signals or by-directional signals to a given macrocell within the integrated circuit design.

In order to more readily ensure the synchronised operation of the primary integrated circuit and the tracking integrated circuit, it is preferred that one of said primary integrated circuit and said tracking integrated circuit generates a clock signal that is used to clock both said primary integrated circuit and said tracking integrated circuit.

It is known within integrated circuit designs to provide boundary scan chains for supporting the JTAG standard operations amongst other reasons. The contents of scan cells within such chains may be selectively switched to output connections of the integrated circuit when it is operating in a boundary scan mode. However, each additional circuit element through which a signal must propagate before reaching the output signal pin of the integrated circuit introduces a disadvantageous additional delay. In order to provide both boundary scan capabilities and the debugging capabilities of the present invention with reduced output signal delay, it is preferred that said primary integrated circuit and said tracking integrated circuit both include a chain of boundary scan cells, at least one scan cell of said chain of boundary scan cells sharing an external output connection with one of said plurality of multiplexers, a multiplexer at a shared external output connection comprising a first multiplexer for selecting one of an internal signal associated with said shared external output connection and an output of a scan cell associated with said shared external output connection and a second multiplexer for selecting one of an output of said first multiplexer and an external output signal generated by one of said plurality of macrocells and associated with said shared external output connection.

Viewed from another aspect the present invention provides an integrated circuit operable in a normal mode and a diagnostic mode, said integrated circuit comprising:
  a plurality of macrocells, said plurality of macrocells including a central processing unit core, being interconnected and in operation ilteracting such that a plurality of signals exchanged between said macrocells are internal signals not available at any external connection to said integrated circuit when operating in said normal mode;

a plurality of multiplexers, each multiplexer serving to select for output from an external output connection of said integrated circuit one of:

in said normal mode of said integrated circuit in which said plurality of macrocells interact, external output signals generated by one of said plurality of macrocells; and in said diagnostic mode of said integrated circuit in which said plurality of macrocells continue to interact as in said normal mode, one of said internal signals, said plurality of multiplexers selecting at least all internal input signals to said microprocessor core.

Viewed from a further aspect the present invention provides a method of testing an integrated circuit design, said method comprising the steps of:

providing a primary integrated circuit according to said integrated circuit design, said primary integrated circuit being operable in a normal mode and a diagnostic mode, said primary integrated circuit comprising:

a plurality of macrocells, said plurality of macrocells being interconnected and in operation interacting such that a plurality of signals exchanged between said macrocells are internal signals not available at any external connection to said integrated circuit when operating in said normal mode;

a plurality of multiplexers, each multiplexer serving to select for output from an external output connection of said integrated circuit one of:

in said normal mode of said integrated circuit in which said plurality of macrocells interact, external output signals generated by one of said plurality of macrocells; and in said diagnostic mode of said integrated circuit in which said plurality of macrocells continue to interact as in said normal mode, one of said internal signals;

providing a tracking integrated circuit having an identical structure to said primary integrated circuit;

providing a further tracking integrated circuit containing at least one macrocell in common with said primary integrated circuit and said tracking integrated circuit and for which macrocell internal signals output from said tracking integrated circuit may be applied as external input signals to said further tracking integrated circuit to generate external output signals of said macrocell within said further tracking integrated circuit that correspond to internal signals within said tracking integrated circuit;

operating said primary integrated circuit in said normal mode;

operating said tracking integrated circuit in said diagnostic mode; and supplying said primary integrated circuit and said tracking integrated circuit with identical external input signals.

The above, and other objects features and advantages of this invention will be apparent from the following detailed description of illustrative embodiments which is to be read in connection with the accompanying drawings.

DESCRIPTION OF THE PREFERRED EMBODIMENTS

Figure 2:
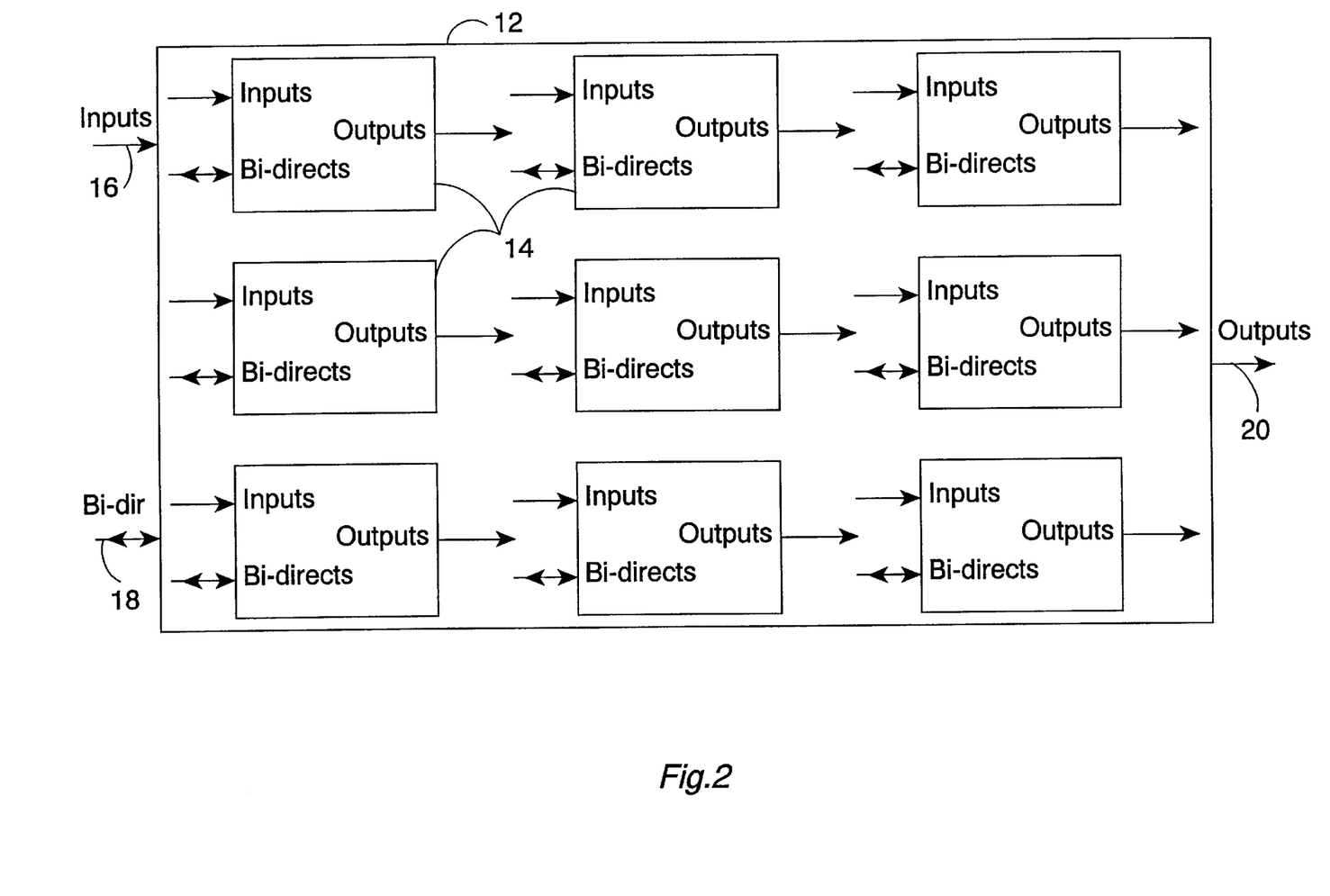
FIG. 2 conceptually illustrates an application specific integrated circuit incorporating a plurality of macrocells.

FIG. 2 conceptually illustrates an application specific integrated circuit 12 incorporating a plurality of macrocells 14. In operation, the inacrocells 14 are interconnected and interact to provide the external inputs and outputs 16, 18, 20 from the application specific integrated circuit 12.

The signals coupled to both an individual macrocell 14 and the application specific integrated circuit 12 fall into three classes, namely input signals, output signals and bidirectional signals.

Figure 3:
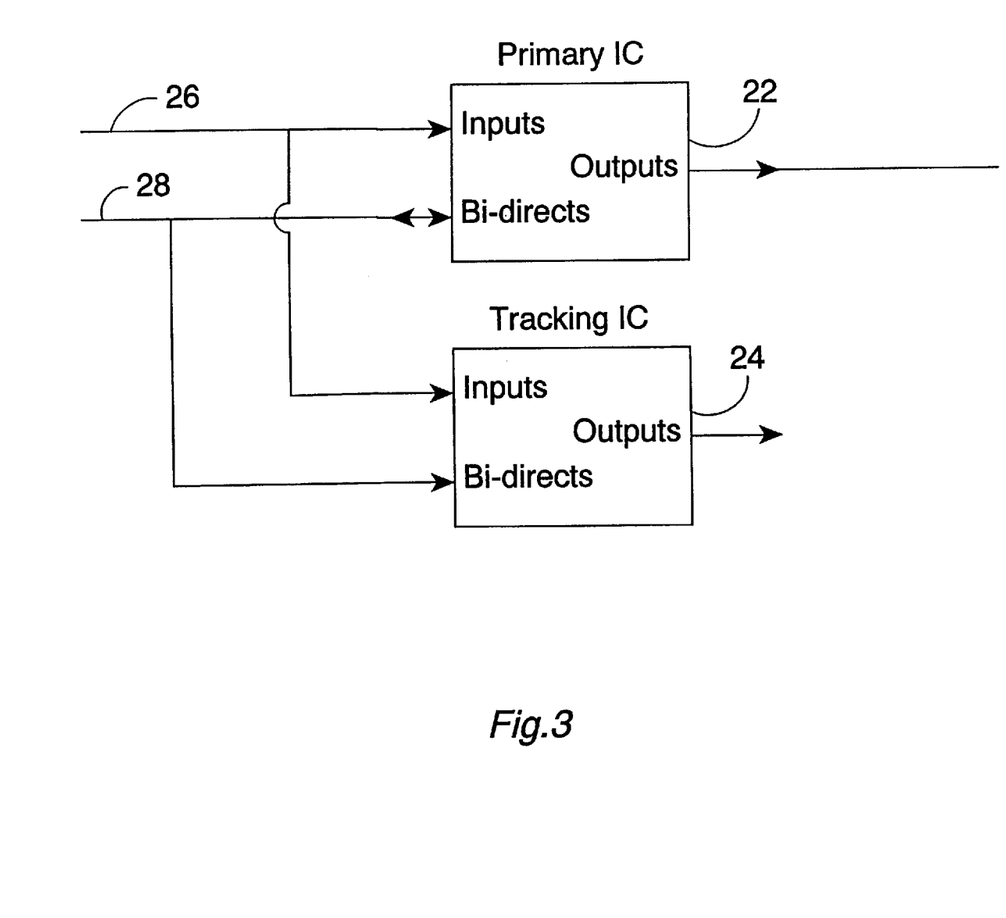
FIG. 3 illustrates the principle of tracking between two integrated circuits.

FIG. 3 illustrates the principle of tracking. FIG. 3 shows a primary integrated circuit 22 and a tracking integrated circuit 24 (these could also be considered to be primary and tracking macrocells). Both the primary integrated circuit 22 and the tracking integrated circuit 24 are provided with identical external input signals upon lines 26 and 28. The bidirectional connections to the tracking integrated circuit 24 are configured such that they only receive signals and any signals they attempt to drive out are blocked since these signals will already be being driven out by the primary integrated circuit 22.

In operation, both the primary integrated circuit 22 and the tracking integrated circuit 24 are clocked in synchronism (the clock signal can be considered as one of the inputs), and adopt identical states assuming neither includes a manufacturing defect causing it to deviate from their shared integrated circuit design. Thus, the primary integrated circuit 22 and the tracking integrated circuit 24 can be considered as highly complex state machines that cycle through identical states. The normal outputs are selected with multiplexers in the primary integrated circuit 22 whilst in the tracking integrated circuit 24 predetermined internal signals may be selected by corresponding multiplexers at the outputs to reveal information concerning the internal operation of both the primary integrated circuit 22 and the tracking integrated circuit 24.

Figure 4:
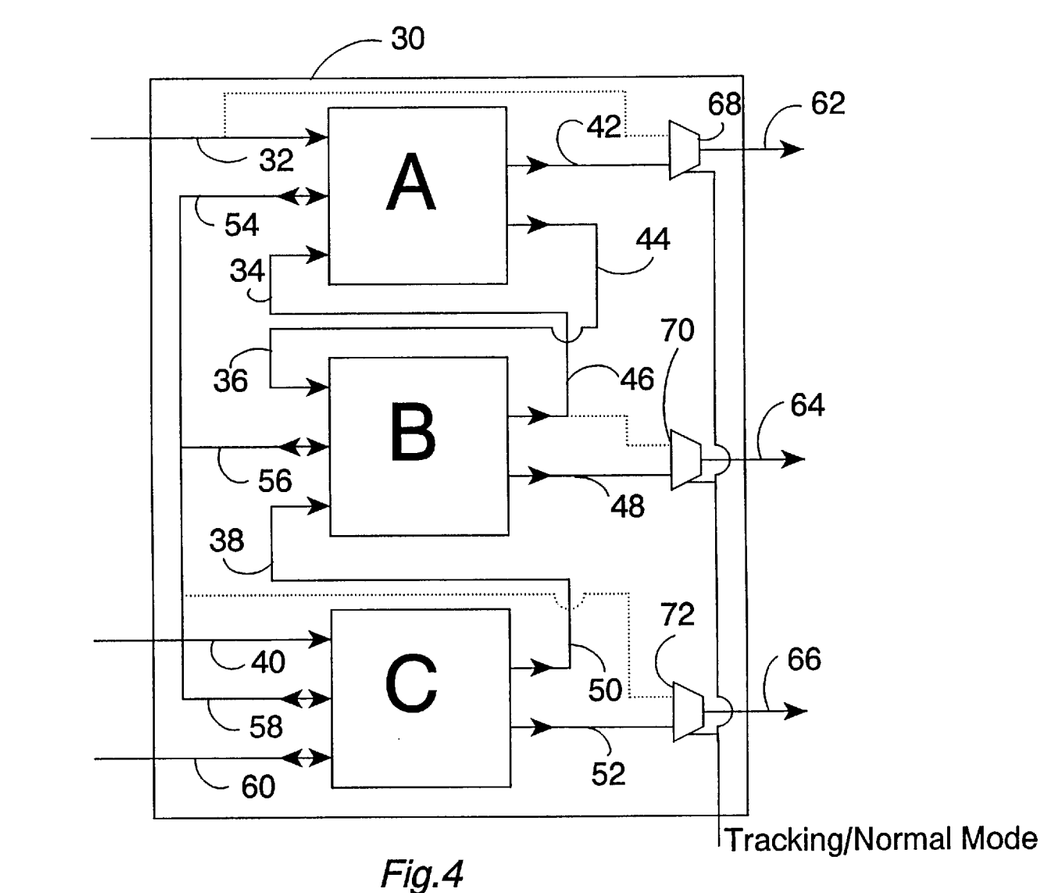
FIG. 4 illustrates an integrated circuit incorporating a plurality of macrocells and with internal signals selectively multiplexed out of the integrated circuit on lines which are normally used for external output signals.

FIG. 4 illustrates an integrated circuit 30 incorporating a plurality of macrocells A, B and C and utilising one embodiment of the present invention. It will be seen that each of the macrocells A, B and C has associated input signals 32, 34, 36, 38 and 40, output signals 42, 44, 46, 48, 50 and 52 and bidirectional signals 54, 56, 58 and 60. Bidirectional signals 54, 56 and 58 are interconnected and are identical. The macrocells A, B and C are interconnected such that output signals 44, 46 and 50 of certain macrocells provide input signals 36, 34 and 38 to other of the macrocells. In operation, the macrocells A, B and C of the integrated circuit 30 interact through exchange of these signals to provide a complex overall operation. Certain bugs that arise within the design of the integrated circuit 30 will be due to the exchange of these signals and so may only properly be analyzed when each of the macrocells A, B and C are active and continue to interact with one another.

The output signals 42, 48 and 52 are external output signals that in operation in a normal mode are routed to external output connections 62, 64 and 66 via multiplexers 68, 70 and 72 respectively. When a trackling mode signal supplied at a single external pin of the integrated circuit 30 is asserted, it serves to switch each of the multiplexers 68, 70 and 72 to select an alternative signal for passing to the external output connection. In this case, the signals 32, 34 and 54 are selected. These are all of the input signals to the macrocell A.

Figure 5:
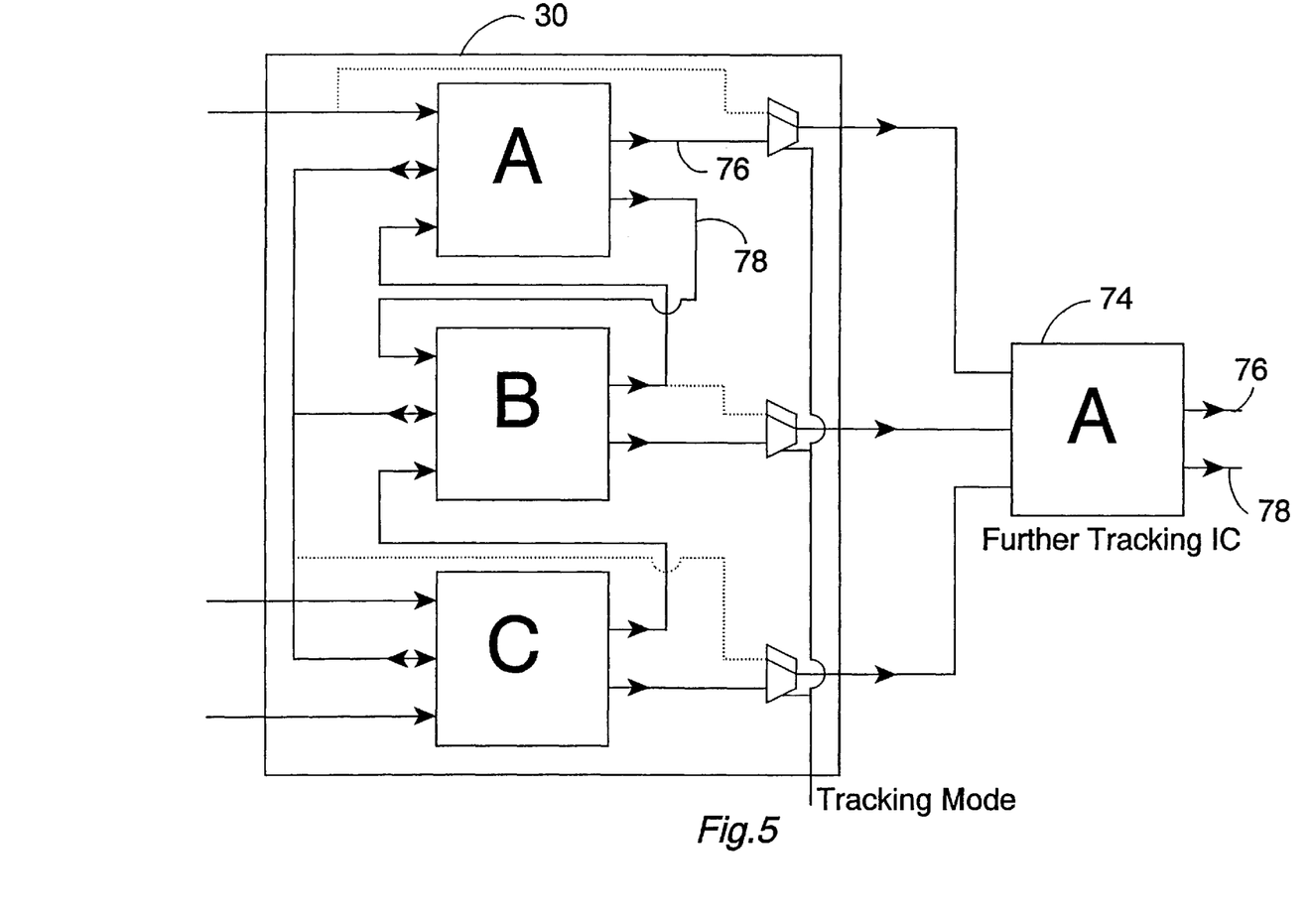
FIG. 5 schematically illustrates the operation of the integrated circuit of FIG. 4 as a tracking integrated circuit cooperating with a further tracking integrated circuit that may be a stand-alone version of a complex macrocell.

FIG. 5 illustrates the integrated circuit 30 of FIG. 4 operating in the tracking mode and coupled to a further tracking integrated circuit 74 that is a stand alone version of the macrocell A. In this way, identical input signals that are being supplied to the macrocell A within the integrated circuit 30 can also be supplied to the further tracking integrated circuit 74 that should respond in an identical fashion and so produce identical output signals 76 and 78 to those produced by the macrocell A within the integrated circuit 30. In this way, a full set of the input signals and the output signals of the macrocell A as it operates in cooperation with the macrocells B and C may be produced for the purpose of debugging the operation of the integrated circuit 30.

Figure 6:
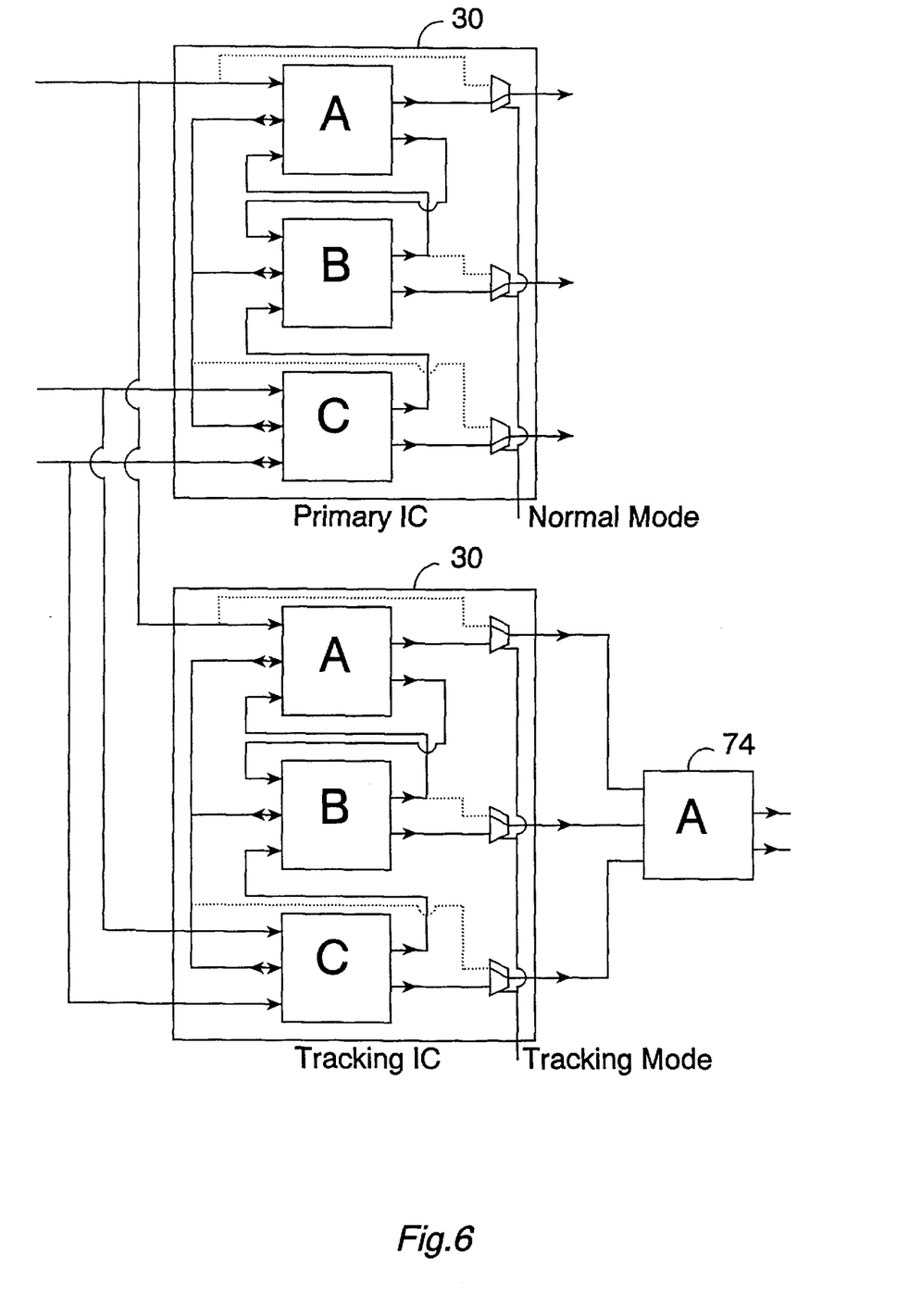
FIG. 6 illustrates the integrated circuit of FIG. 4 being simultaneously used as a primary integrated circuit and a tracking integrated circuit cooperating with a further tracking integrated circuit.

FIG. 6 illustrates the operation of a primary integrated circuit, a tracking integrated circuit (both having the form illustrated in FIGS. 4 and 5) and a further tracking integrated circuit 74. The inputs to the primary integrated circuit and the tracking integrated circuit are interconnected and identical. For the primary integrated circuit, the multiplexers are switched by the applied mode selecting signal to adopt the normal mode and output the usual external output signals. For the tracking integrated circuit, the multiplexers are switched to select the specific internal signals required to determine the full set of inputs to the macrocell A.

Figure 7:
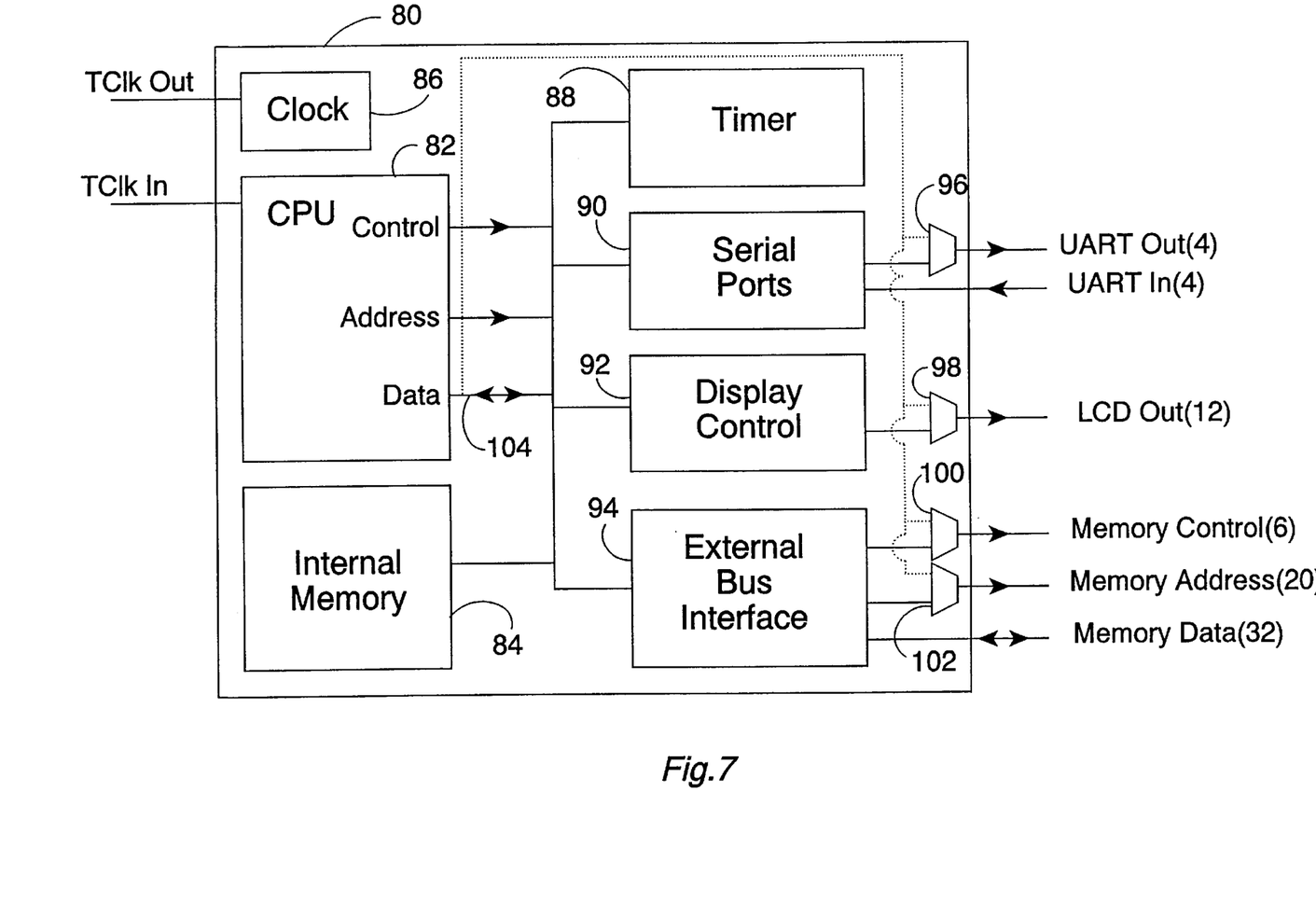
FIG. 7 illustrates another embodiment of the invention in the form of an application specific integrated circuit incorporating a plurality of macrocells.

FIG. 7 illustrates a further embodiment of the invention in the form of an application specific integrated circuit 80 including a central processing unit core 82 an internal memory 84, an internal cloclk generating circuit 86, a timer circuit 88, a serial port circuit 90, a display controller 92 and an external bus interface circuit 94. Such a highly integrated application specific integrated circuit 80 goes a considerable way to providing a full data processing system upon a single integrated circuit. This reduces the cost, size and power consumption of such system whilst increasing its reliability and speed. The total pin count of the integrated circuit 80 is eighty, which is relatively low, and so allows a comparatively small integrated circuit to be produced. Of this total of external connections, forty two are external output connections with associated multiplexers 96, 98, 100 and 102 that may be used to select alternative otherwise internal signals for output from the integrated circuit 80 during debug. Of particular interest in debugging such an integrated circuit 80 are the data words upon the data bus 104 (and possible interrupts and other control signals).

Figure 8:
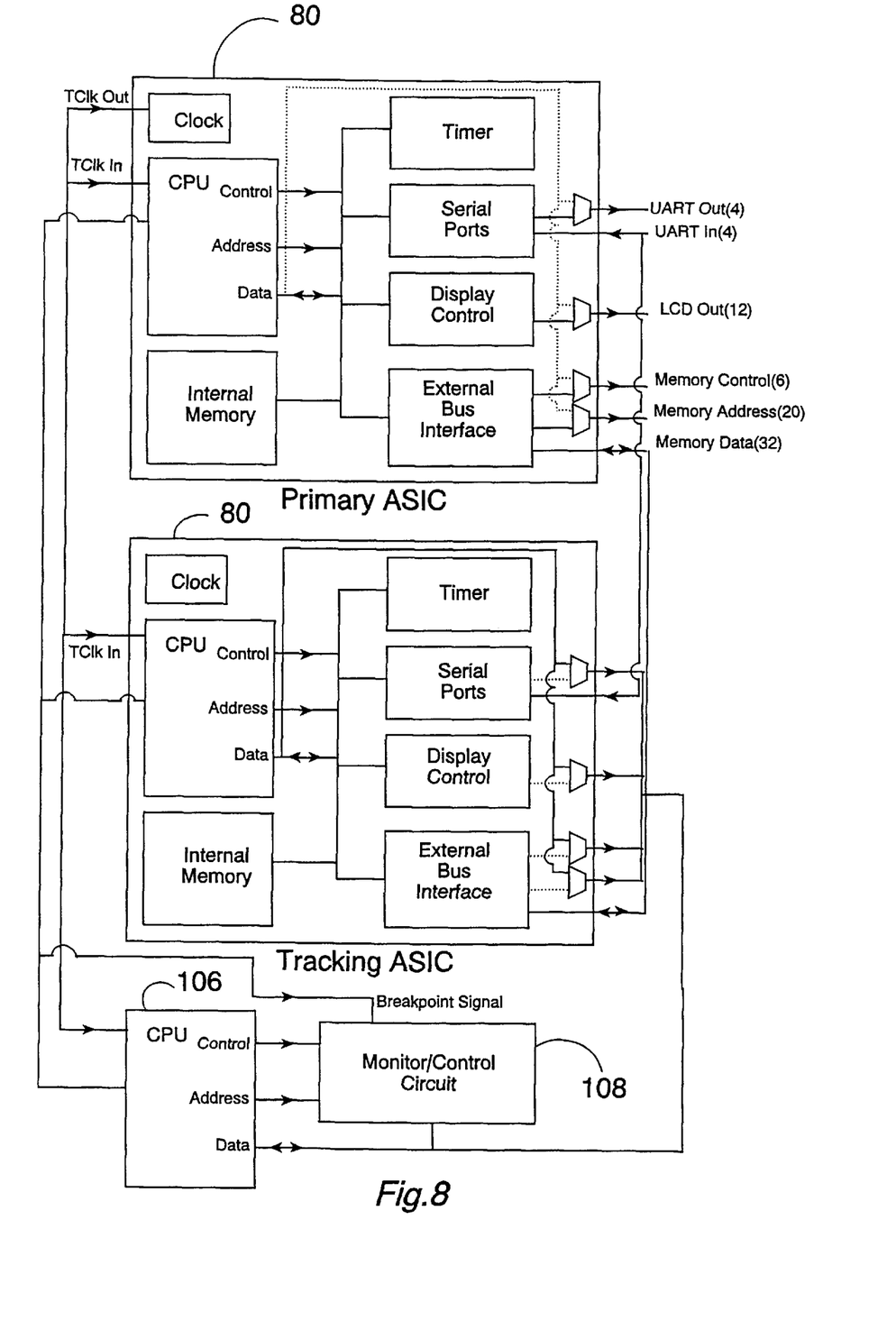
FIG. 8 illustrates the integrated circuit of FIG. 7 being used both as a primary, tracking and further tracking integrated circuit within a system for debugging the integrated circuit design.

FIG. 8 illustrates two integrated circuits 80 acting together as a primary ASIC and a tracking ASIC. The internal clockx generating circuit 86 of the primary ASIC supplies the test clock to the primary ASIC, the tracking ASIC and a further tracking ASIC 106. These circuits accordingly operate in synchronism. The input signals supplied to the primary ASIC and the tracking ASIC (namely UART In and Memory Data) are identical. The multipiexers within the tracking ASIC serve to select the signals upon the data bus 104 for output. The signals on the data bus 104 are supplied as input signals to the further tracking integrated circuit 106 which accordingly mimics the operation of the central processing unit cores within the primary ASIC and the tracking ASIC and generates identical control and address signals. All of the signals input to and output from the further tracking integrated circuit 106 are supplied to a monitor circuit 108 that in turn is able to generate the control signals such as break point signals and interrupt signals that can be fed back to the primary ASIC and the tracking ASIC.

Figure 9:
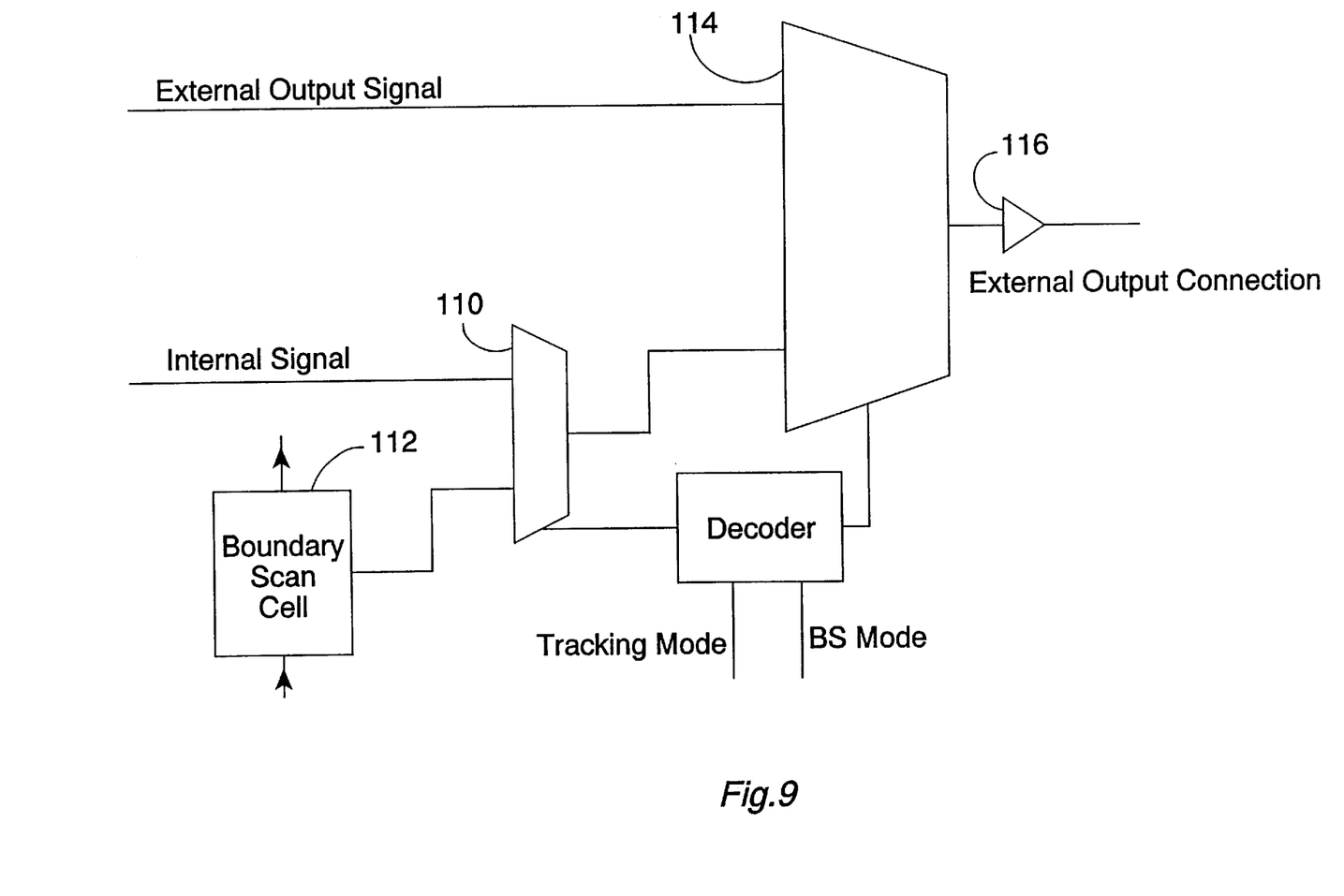
FIG. 9 illustrates the multiplexing arrangement at an external output connection for embodiments incorporating both a boundary scan chain and the multiplexing out of internal signals.

FIG. 9 illustrates the multiplexing arrangement at an external output connection of an integrated circuit. A first multiplexer 110 serves to select between the contents of a boundary scan cell 112 (this forms part of a chain of such boundary scan cells) and an internal signal that is normally not output from the integrated circuit. A second multiplexer 114 serves to select between the normal external output signals that is produced in the normal mode (as distinct from the boundary scan mode or the diagnostic/tracking mode) and the output of the first multiplexer 110. The output of the second multiplexer 114 is buffered and amplified by circuit 116 before being driven off-chip through an external connection. A decoder receives tracking mode and boundary scan mode selecting signals and switches the multiplexers 112 and 114 accordingly.

Although illustrative embodiments of the invention have been described in detail herein with reference to the accompanying drawings, it is to be understood that the invention is not limited to those precise embodiments. and that various changes and modifications can be effected therein by one skilled in the art without departing from the scope and spirit of the invention as defined by the appended claims.

I claim:

1. Apparatus for testing an integrated circuit design, said apparatus comprising:

a primary integrated circuit according to said integrated circuit design, said primary integrated circuit and operable in a normal mode and a diagnostic mode, said primary integrated circuit comprising:

a plurality of macrocells, said plurality of macrocells being interconnected and in operation interacting such that a plurality of signals exchanged between said macrocelis are internal signals not available at any external connection to said integrated circuit when operating in said normal mode;

a plurality of multiplexers, each multiplexer serving to select for output from an external output connection of said integrated circuit one of:

in said normal mode of said integrated circuit in which said plurality of macrocells interact, external output signals generated by one of said plurality of macrocells; and in said diagnostic mode of said integrated circuit in which said plurality of macrocells continue to interact as in said normal mode, one of said internal signals;

a tracking integrated circuit having an identical structure to said primary integrated circuit; and a further tracking integrated circuit containing at least one macrocell in common with said primary integrated circuit and said tracking integrated circuit and for which macrocell internal signals output from said tracking integrated circuit may be applied as external input signals to said further tracking integrated circuit to generate external output signals of said macrocell Within said further tracking integrated circuit that correspond to internal signals within said tracking integrated circuit; wherein said primary integrated circuit and said tracking integrated circuit are supplied with identical external input signals; and said primary integrated circuit is in said normal mode and said tracking integrated circuit being in said diagnostic mode.

2. Apparatus as claimed in claim 1, comprising a monitoring circuit responsive to external signals to and form said further tracking integrated circuit to generate control signals for controlling operation of said primary integrated circuit and said tracking integrated circuit.

3. Apparatus as claimed in claim 2. wherein said control signals include at least one of an interrupt signal and a breakpoint signal.

4. Apparatus as claimed in claim 1, wherein said plurality of macrocells include a central processing unit core and all internal signals input to said central processing unit core within said primary integrated circuit and said tracking integrated circuit are connected to respective ones of said plurality of multiplexers.

5. Apparatus as claimed in claim 4, wherein said further tracking integrated circuit comprises said central processing unit core for which all signals exchanged with other macrocells within said primary integrated circuit and said tracking integrated circuit are coupled to external connections.

6. Apparatus as claimed in claims 1, wherein said internal signals output from said tracking integrated circuit include bidirectional signals within said primary integrated circuit and said tracking integrated circuit.

7. Apparatus as claimed in claim 1. wherein one of said primary integrated circuit and said tracking integrated circuit generates a clock signal that is used to clock both said primary integrated circuit and said tracking integrated circuit.

8. Apparatus as claimed in claim 1, wherein said primary integrated circuit and said tracking integrated circuit both include a chain of boundary scan cells, at least one scan cell of said chain of boundary scan cells sharing an external output connection with one of said plurality of multiplexers, a multiplexer at a shared external output connection comprising a first multiplexer for selecting one of an internal signal associated with said shared external output connection and an output of a scan cell associated with said shared external output connection and a second multiplexer for selecting one of an output of said first multiplexer and an external output signal generated by one of said plurality of macrocells and associated with said shared external output connection.

9. An integrated circuit operable in a normal mode and a diagnostic mode, said integrated circuit comprising:

a plurality of macrocells, said plurality of macrocells including a central processing unit core, being interconnected and in operation interacting such that a plurality of signals exchanged between said macrocells are internal signals not available at any external connection to said integrated circuit when operating in said normal mode;

a plurality of multiplexers, each multiplexer serving to select for output from an external output connection of said integrated circuit one of:

in said normal mode of said integrated circuit in which said plurality of macrocells interact, external output signals generated by one of said plurality of macrocells; and in said diagnostic mode of said integrated circuit in which said plurality of macrocells continue to interact as in said normal mode, one of said internal signals, said plurality of multiplexers selecting at least all internal input signals to said microprocessor core.

10. A method of testing an integrated circuit design. said method comprising the steps of:

providing a primary integrated circuit according to said integrated circuit design, said primary integrated circuit being operable in a normal mode and a diagnostic mode, said primary integrated circuit comprising:

a plurality of macrocells, said plurality of macrocells being interconnected and in operation interacting such that a plurality of signals exchanged between said macrocells are internal signals not available at any external connection to said integrated circuit when operating in said normal mode;

a plurality of multiplexers, each multiplexer serving to select for output from an external output connection of said integrated circuit one of:

in said normal mode of said integrated circuit in which said plurality of macrocells interact, external output signals generated by one of said plurality of macrocells; and in said diagnostic mode of said integrated circuit in which said plurality of macrocells continue to interact as in said normal mode, one of said internal signals;

providing a tracking integrated circuit having an identical structure to said primary integrated circuit;

providing a further tracking integrated circuit containing at least one macrocell in common with said primary integrated circuit and said tracking integrated circuit and for which macrocell internal signals output from said tracking integrated circuit may be applied as external input signals to said further tracking integrated circuit to generate external output signals of said macrocell within said further tracking integrated circuit that correspond to internal signals within said tracking integrated circuit;

operating said primary integrated circuit in said normal mode;

operating said tracking integrated circuit in said diagnostic mode; and supplying said primary integrated circuit and said tracking integrated circuit with identical external input signals.

* * * * *